(12) United States Patent
Rhee et al.

(10) Patent No.: US 8,972,549 B2
(45) Date of Patent: *Mar. 3, 2015

(54) USER-PREFERENCE-BASED DSL SYSTEM

(75) Inventors: Wonjong Rhee, Palo Alto, CA (US);
John M. Cioffi, Atherton, CA (US);
Peter J. Silverman, Evanston, IL (US);
Georgios Ginis, San Francisco, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 1911 days.

This patent is subject to a terminal disclaimer.

(21) Appl. No.: 11/342,003

(22) Filed: Jan. 28, 2006

(65) Prior Publication Data

US 2006/0280235 A1 Dec. 14, 2006

Related U.S. Application Data

(60) Provisional application No. 60/689,362, filed on Jun. 10, 2005, provisional application No. 60/698,113, filed on Jul. 10, 2005.

(51) Int. Cl.
*H04B 1/38* (2006.01)
*H04L 12/24* (2006.01)
(Continued)

(52) U.S. Cl.
CPC .............. *H04L 41/142* (2013.01); *H04L 41/18* (2013.01); *H04M 3/304* (2013.01); *H04M 11/062* (2013.01); *H04L 41/0213* (2013.01); *H04M 3/42068* (2013.01); *H04M 3/42161* (2013.01)
USPC .......................................................... 709/223

(58) Field of Classification Search
USPC .......................... 375/219–223; 370/241–253; 709/223–226
See application file for complete search history.

(56) References Cited

U.S. PATENT DOCUMENTS 5,465,321 A * 11/1995 Smyth ............................ 706/20
6,067,565 A * 5/2000 Horvitz ......................... 709/218

(Continued)

FOREIGN PATENT DOCUMENTS

WO WO-03003811 1/2003

OTHER PUBLICATIONS

International Search Report, International Application No. PCT/IB2006/000771 (4 pgs).

(Continued)

*Primary Examiner* — Thai Nguyen
(74) *Attorney, Agent, or Firm* — Blakely, Sokoloff, Taylor & Zafman (57) ABSTRACT

Methods, apparatus and computer program products allow a user of DSL or the like to implement user preferences to the extent feasible in light of operational limits and conditions. In some embodiments, an operational profile is imposed on the user. User preference data is evaluated to determine the extent to which one or more user preferences can be implemented in light of the operational profile. One or more controllers can assist in collecting user preference data, evaluating the user preference data, operational data and other data and information, and implementing user preferences as feasible. Evaluation of the user preference data and operational profile and/or data can include considering the compatibility of the user's preferences and the operational profile and/or data. Controllers assisting users can include a local controller at the user's location, one or more upstream-end local controllers, one or more remote location controllers, and/or one or more other downstream-end device controllers at locations other than the user's location. Data and information can be shared among the various controllers, either using the DSL system itself or using a proprietary or other alternative data system.

21 Claims, 6 Drawing Sheets

(51) Int. Cl.
*H04M 3/30* (2006.01)
*H04M 11/06* (2006.01)
*H04M 3/42* (2006.01)

(56) References Cited

U.S. PATENT DOCUMENTS

| | | | |
|---|---|---|---|
| 6,374,288 | B1 | 4/2002 | Bhagavath et al. |
| 6,819,746 | B1* | 11/2004 | Schneider et al. ......... 379/29.01 |
| 6,829,250 | B2 | 12/2004 | Voit et al. |
| 7,218,729 | B2* | 5/2007 | Zhou ............................ 379/394 |
| 7,568,045 | B1* | 7/2009 | Agrawal ....................... 709/233 |
| 2002/0044567 | A1 | 4/2002 | Voit et al. |
| 2002/0093985 | A1* | 7/2002 | Nimmagadda ................ 370/493 |
| 2005/0123027 | A1 | 6/2005 | Cioffi |
| 2005/0123071 | A1 | 6/2005 | Okada et al. |
| 2005/0288029 | A1* | 12/2005 | Jacobsen ....................... 455/447 |

OTHER PUBLICATIONS

Written Opinion of the International Searching Authority, International Application No. PCT/IB2006/000771 (9 pgs).

Non-Final Office Action for U.S. Appl. No. 11/342,023, Mailed Jul. 6, 2009, 24 pages.

European Patent Office, "First Examination Report", European Application No. 06710587.4, (May 30, 2008).

International Searching Authority, "International Search Report and Written Opinion", International Application No. PCT/IB2006/00658, (Jul. 23, 2007).

Official Report for Australian Patent Application No. 2006256483 mailed Feb. 1, 2010, 3 pages.

Non-Final Office Action for U.S. Appl. No. 11/342,023, Mailed Nov. 17, 2009, 21 Pages.

Office Action for U.S. Appl. No. 11/342,023 mailed May 18, 2010, 17 pages.

Non-Final Office Action for Chinese Application No. 200680027103.0 mailed Aug. 30, 2010, 17 pages.

Non-Final Office Action for Chinese Application No. 200680027629.9, Mailed Sep. 14, 2010, 6 pages.

Final Office Action for U.S. Appl. No. 11/342,023 mailed Sep. 27, 2010, 18 pages.

Non-Final Office Action for European Patent Application No. 06727414.2 mailed Sep. 7, 2010, 5 Pages.

* cited by examiner

USER-PREFERENCE-BASED DSL SYSTEM

CROSS-REFERENCE TO RELATED APPLICATIONS

This application claims the benefit of priority under 35 U.S.C. §119(e) of the following:

U.S. Provisional Ser. No. 60/689,362 filed on Jun. 10, 2005, entitled USER-CONTROLLED PREFERENCE-BASED XDSL, the entire disclosure of which is incorporated herein by reference in its entirety for all purposes.

U.S. Provisional No. 60/698,113 filed on Jul. 10, 2005, entitled DSL SYSTEM, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems and apparatus for managing digital communications systems.

2. Description of Related Art

Digital subscriber line (DSL) technologies provide potentially large bandwidth for digital communication over existing telephone subscriber lines (referred to as loops and/or the copper plant). In particular, DSL systems can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

DSL systems are configurable to a degree that allows certain trade-offs among and between performance aspects of such DSL systems. Thus, the configuration of a DSL system often has an effect on customers' satisfaction in their use of the DSL service. Users and other non-operators have not been capable to obtain, record, evaluate and/or implement performance aspects that are most significant to users and to configure a DSL system to accommodate such preferences.

Systems, apparatus, methods and techniques that provide improvements for identifying the user preferences with respect to a DSL system and for configuring a DSL system to satisfy the user preferences without requiring the intervention of a DSL system operator would represent a significant advancement in the art. Also, systems, apparatus, methods and techniques for implementing such user preference assessment and DSL system configuration likewise would represent a significant advancement in the art.

BRIEF SUMMARY

Embodiments of the present invention include methods, apparatus and computer program products wherein a user of DSL or another party other than an operator can implement user preferences to the extent feasible in light of operational limits and conditions. A DSL system operator (such as a telco CLEC or ILEC) is able to define, limit, set and control the "operational space" of the system, where the "operational space" includes the rules, permitted uses, characteristics, operational parameter ranges, etc. that define how users can use such a system. Thus, in some embodiments, such an operational space is imposed on the user/non-operator. A non-operator party collects and analyzes information and/or data from the DSL system to construct a model or profile of the operational space. This constructed operational profile is then used as a reference in evaluating user preference data that is collected from one or more users in the DSL system.

User preference data is evaluated to determine the extent to which one or more user preferences can be implemented in light of the operational profile. One or more controllers can assist in collecting data pertaining to the operational space, user preference data, evaluating the user preference data, operational data and other data and information, and implementing user preferences as feasible. Evaluation of the user preference data and operational profile and/or data includes considering the compatibility of the user's preferences and the operational profile and/or data that are used to approximate the operational space defined by an operator. Controllers according to the present invention and/or assisting users in implementing the present invention can include a local controller at the user's location, one or more upstream-end local controllers, one or more remote location controllers, and/or one or more other downstream-end device controllers at locations other than the user's location. Data and information can be shared among the various controllers in some embodiments, either using the DSL system itself or using a proprietary or other alternative data system.

User preference data can be obtained from direct communication with one or more users about their preferences or can be learned using indirect means, such as Hidden Markov Models and the like. The user can update this user preference data from time to time to adjust the user's use of the DSL system or the like.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Figure 1:
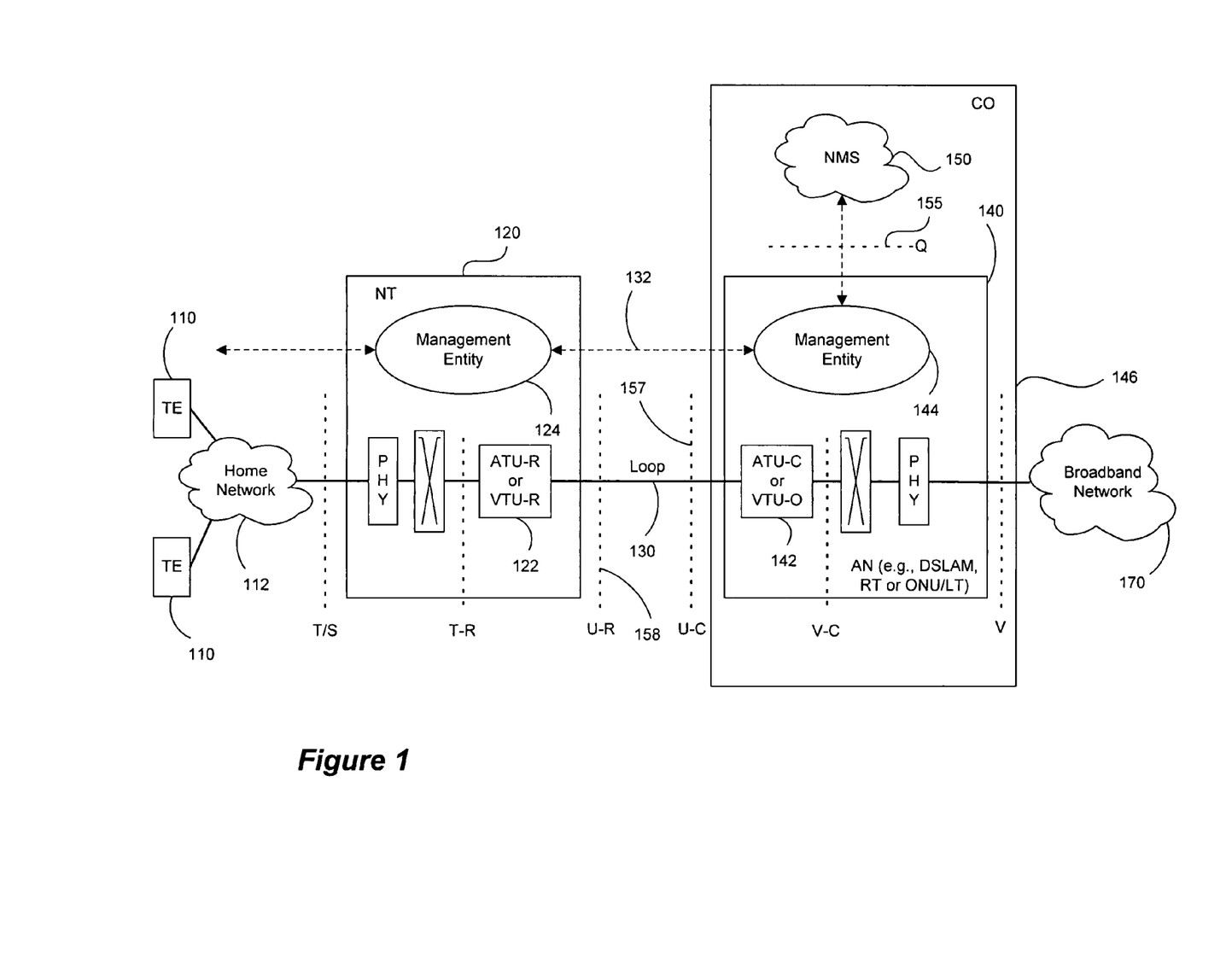
FIG. 1 is a schematic block reference model system per the G.997.1 standard applicable to various DSL and other communication systems in which embodiments of the present invention may be used.
Figure 2:
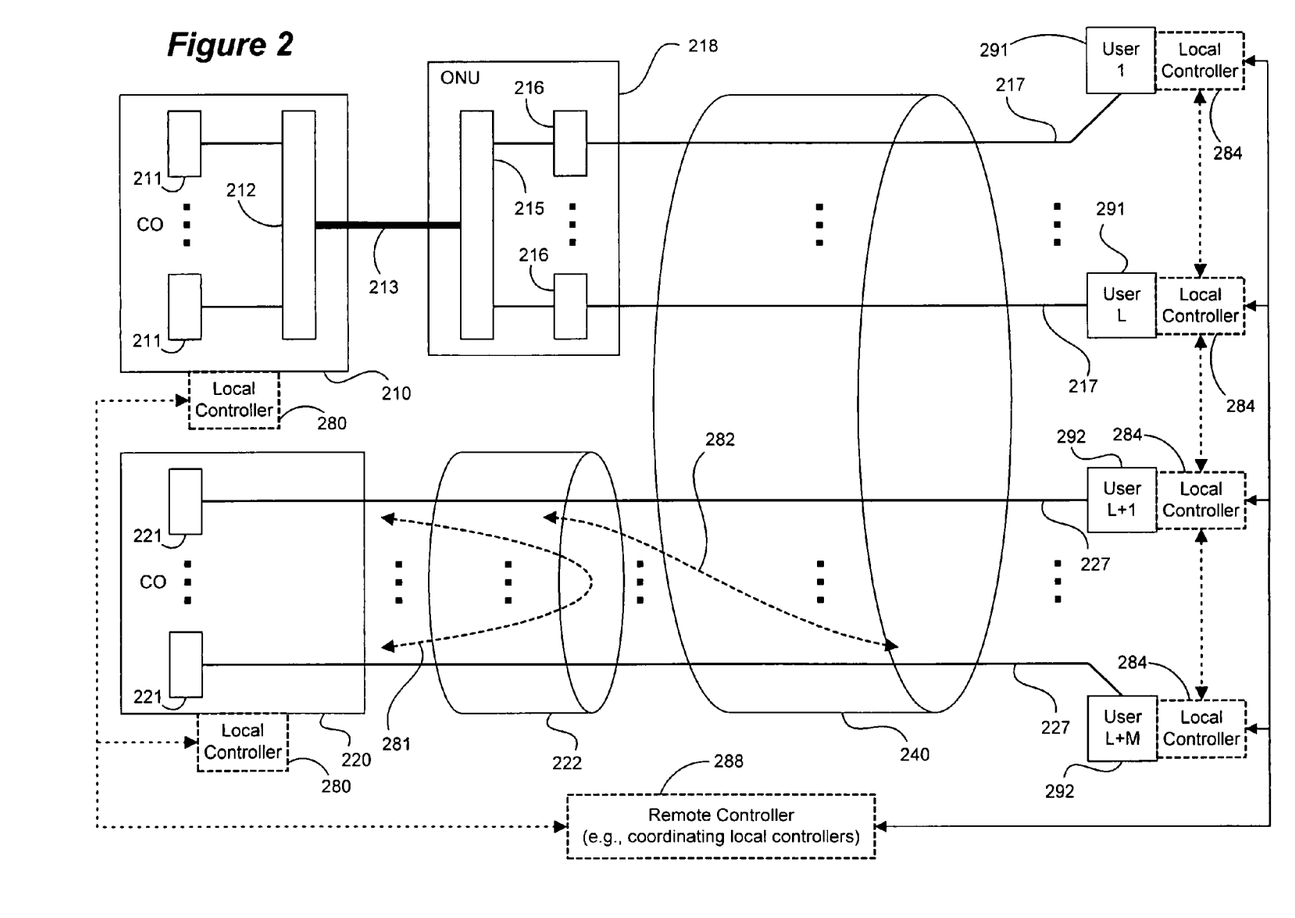
FIG. 2 is a schematic diagram illustrating generic, exemplary DSL deployment showing one or more embodiments of the present invention.

A "DSL system operator" generally is any party that controls, operates and/or owns an access node or the like (for example, a DSLAM, an ONU, an RT, an LT, etc.) in a DSL system, such as those shown in FIGS. 1 and 2 and others that are well-known to those skilled in the art. A controller, a "smart" modem and/or computer system can be used by a party other than a DSL system operator (for example, a user, a service provider other than a DSL system operator, etc.) to collect and analyze the operational data and/or performance parameter values as described in connection with the various embodiments of the present invention. The controller and/or other components can be a computer-implemented device or combination of devices. In some embodiments, the controller is in a location remote from modems or other communication equipment coupled to a communication line. In other cases, the controller may be collocated with one of or both of the "local" devices (that is, devices directly coupled to a communication line or part of such a local device) such as equipment directly connected to a modem, LT device, DSLAM or other communication system device, thus creating a "smart" modem. In addition, as will be appreciated by those skilled in the art, the controller may be coupled to any other type of data transmission system in which the present invention would be useful. The phrases "coupled to" and "connected to" and the like are used herein to describe a connection between two elements and/or components and are intended to mean coupled either directly together, or indirectly, for example via one or more intervening elements or via a wireless connection, where appropriate. Moreover, references to a "communication system" also are intended, where applicable, to include reference to any other type of data transmission system.

Some of the following examples of embodiments of the present invention will be used in connection with ADSL and/or VDSL systems as exemplary data transmission systems. Within these DSL systems, certain conventions, rules, protocols, etc. may be used to describe operation of the exemplary DSL system and the information and/or data available from users of and/or equipment coupled to the system. However, as will be appreciated by those skilled in the art, embodiments of the present invention may be applied to various types of data transmission systems, and the invention thus is not limited to any particular system.

Various network-management elements are used for management of ADSL and VDSL physical-layer resources, where elements refer to parameters or functions within an ADSL or VDSL modem pair, either collectively or at an individual end. A network-management framework consists of one or more managed nodes, each containing an agent. The managed node could be a router, bridge, switch, modem or other. At least one NMS (Network Management System), which is often called the manager, monitors and controls managed nodes and is usually based on a common PC or other computer. NMS is in some instances also referred to as an Element Management System (EMS). NMS and EMS systems are considered to be parts of Operations Support Systems (OSS). A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite (G.992.4), ADSL2+ (G.992.5), VDSL1 (G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

The G.997.1 standard specifies the physical layer management for ADSL and VDSL transmission systems based on the clear embedded operation channel (EOC) defined in G.997.1 and use of indicator bits and EOC messages defined in G.99x standards. Moreover, G.997.1 specifies network management elements content for configuration, fault and performance management. In performing these functions, the system utilizes a variety of operational data that are available at and can be collected from an access node (AN). The DSL Forum's TR69 report also lists the MIB and how it might be accessed. In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In this invention, such VTU-O's (or equivalents) are coordinated in terms of transmission (downstream) and reception (upstream) of all or many of the lines terminating on the termination device. Such coordinated transmission reception constitutes a vectored line-termination device. In FIG. 1, ATU-C 142 is located at an access node (AN) 140 in a CO 146. AN 140 may be a DSL system component, such as a DSLAM, ONU/LT, RT or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL (and VDSL) typically is a telephone twisted pair that also carries other communication services.

Several of the interfaces shown in FIG. 1 can be used for determining and collecting operational and/or performance data. To the extent the interfaces in FIG. 1 differ from another ADSL and/or VDSL system interface scheme, the systems are well known and the differences are known and apparent to those skilled in the art. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 124 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998. Also, DSL Forum Technical Report TR-069, entitled "CPE WAN Management Protocol," dated May 2004. Finally, DSL Forum Technical Report TR-064, entitled "LAN-Side DSL CPE Configuration Specification," dated May 2004. These documents address different situations for CPE side management and the information therein is well known to those skilled in the art. More information about VDSL can be found in the ITU standard G.993.1(sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NAI-2005-031.

It is less common for lines sharing the same binder to terminate on the same line card in ADSL, than it is in VDSL. However, the following discussion of DSL systems may be extended to ADSL because common termination of same-binder lines might also be done (especially in a newer DSLAM that handles both ADSL and VDSL). In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTT-Cab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 218 and ONU 220 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users occurs separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users occurs separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292. In FIG. 2, far end crosstalk (FEXT) 282 and near end crosstalk (NEXT) 281 are illustrated as affecting at least two of the lines 227 collocated at CO 220.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from a DSL NT modem and/or a DSL NMS can be found therein; others may be known to those skilled in the art. In some cases, common data systems might only collect downstream or upstream data, but not both. In such cases, as will be appreciated by those skilled in the art, proprietary and/or other alternative data systems can be implemented to provide more complete data.

It is desirable with some embodiments of the present invention that the lines within a binder terminate on a single line card (on which a vectored DSL chip or device sits or to which such a device is otherwise coupled). There is no guarantee, however, in normal wiring practice that such single-line-card common-binder termination occurs. If it does, crosstalk can be cancelled/exploited with vectoring. The routing of signals can also occur in electronic distribution frames or backplanes, though they can add cost to the overall system. In this way, the line termination ("LT") of VDSL, typically terminating 48, 96 or 192 lines in a neighborhood or building on one or a few line cards, has a relatively good chance of terminating all the lines from a binder on a line card, especially if the telephone company does some work in wiring to ensure such common-card termination.

In a typical communication system, there are numerous tradeoffs among a variety of performance metrics. For instance, data rate and service stability typically are related inversely in a DSL system, where a higher data rate usually increases the probability of service outage and a lower data rate usually reduces the probability of service outage. Operators and service providers typically establish broadly applied rules and implement these rules on all communication links, thus establishing an operational space. A non-operator party collects and analyzes information and/or data from the DSL system to construct a model or profile of the operational space. This constructed operational profile is then used as a reference in evaluating user preference data that is collected from one or more users in the DSL system. This operational profile can include parameter values, parameter ranges, rules applicable to lines and groups of lines (for example, binders), etc.

Typically, evaluation and decisions made about implementation of system operational characteristics and parameters is performed by a service provider or operator of the system, such as telecommunications company (that is, a "telco") or the like (all such centralized system controllers will be referred to herein as "operators"). As mentioned above, DSL operators typically control, operate and/or own access nodes in DSL systems. These access nodes can be DSLAMs, RTs, LTs, ONUs and/or any other similar equipment and/or devices.

A DSL system operator (such as a telco CLEC or ILEC) is able to define, limit, set and control (referred to generally as "defining") the "operational space" of the system, where the "operational space" includes the rules, permitted uses, characteristics, operational parameter ranges, etc. that define how users can use such a system. Using the present invention, user preference data is obtained by the operator and compared to the operator-defined operational space of a communication system, such as a DSL system, to determine whether one or more of the user preferences can be implemented in the system. Where feasible or allowed, an operator can implement user preferences that are not in conflict with the operator's operation of the DSL system. Stated another way, the operator can implement those user preferences that fit within the operational space defined and maintained by the operator.

In embodiments of the present invention, a user (or a party, entity and/or device acting on the user's behalf, such as a controller) can assess the operational profile imposed on the user by an operator and/or service provider. User preference data can then be obtained from a user set (directly and/or indirectly) and compared to the constructed operational profile. The user preference data can come from a user set that comprises a single user or a plurality of users. The comparison of the user preference data and the operational profile can indicate whether one or more user preferences can be implemented within the limitations of the operational profile of the user set. To the extent that one or more user preferences are feasible in light of the operational profile, such wholly or partially feasible user preference(s) can be implemented in the user set's operation.

As suggested above, users' preferences and user preference data reflecting those preferences can be found directly (for example, via user calls, email surveys, user feedback, web interface, etc.) or indirectly (for example, based on one or more Hidden Markov Models of user data activity). A user also can store and update preferences in a controller that can make those preferences available to a DSL Manager, for example through any suitable network such as the internet, and (in some embodiments) to other controllers. Where a plurality of controllers are used in a system, these controllers may be coupled to one another in any suitable fashion (for example, via the internet in a distributed fashion or through an intermediate and/or master controller—perhaps a remote controller independent of the user and operator/service provider).

Examples herein show implementation of embodiments of the present invention for a DSL system where the tradeoff can be between a first performance metric—for example, higher data rate (with a higher probability of service outage)—and a second performance metric—for example, lower probability of service-outage/modem-retraining (with a lower data rate). Other performance metrics can be invoked and used in embodiments of the present invention. Moreover, more than 2 performance metrics may be utilized in evaluating user preference data and its feasibility and/or compatibility for implementation.

In considering the tradeoff between higher data rate and higher service reliability/stability, it is well known that some DSL lines experience degradation caused by a time-varying noise spectrum or by time-varying impulse noise. Such time varying noise directly affects the maximum attainable data rate and/or stability of the lines, where lines experience more unstable service as the noise influence increases. In many situations, this time-varying noise may be other users' crosstalk. Furthermore, when phantom or split-pair circuits are used, some binder capacity can be reallocated on demand to different users as in vectored differential systems, where each line performs as if some of the other lines were not carrying signals anyway. In non-vectored situations, the mutual crosstalk can be a limiting effect in the quality of service and data rates used by any and/or all users.

A DSL modem often operates at a fixed data rate established during training. Any subsequent change in rate or some other operational parameter setting requires a retraining of the modem, which causes a short service outage (for example, 20-60 seconds). These outages can cause user dissatisfaction and/or problems. Where service outage prevention is desirable, lower data rates typically help reduce the frequency of such outages. On the other hand, some users might require and/or desire a high data rate due to the nature of their use, despite any service outages. This second type of user might not interactively use the internet much of time, so that an occasional service outage might be acceptable as long as higher data rates are otherwise preserved.

Operators may provide an operational profile that allows for variations in the performance characteristics of a user's line (or multiple lines, where a user employs a bonded line set, for example). Operational parameter values and ranges for FEC coding, latency, margin, etc. may permit more than one mode of operation for a user's line(s).

Embodiments of the present invention allow users to select operational modes that conform as nearly as possible and/or practical to the users' preferences for performance. For example, users can opt for higher data rates, more stable service, lower latency, less fluctuation in data rate, etc. by providing user preference data (for example, user input or other forms of user preference information like HMM studies). As will be appreciated by those skilled in the art, the present invention can be applied to any communication system. For instance, a wireless service user might use embodiments of the present invention to configure individual user link parameters that are used to tradeoff coverage area and the battery life.

Figure 3:
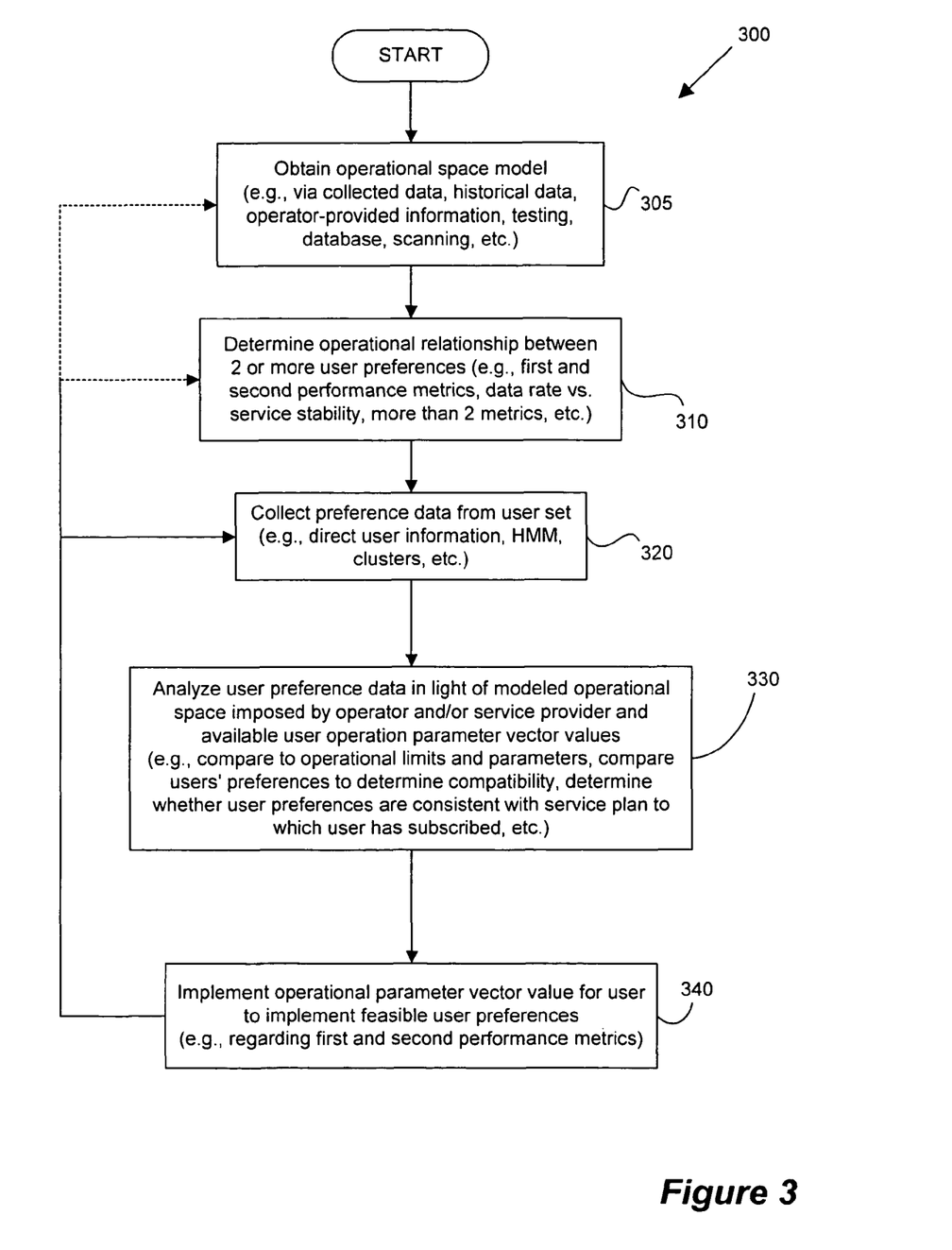
FIG. 3 is a flow diagram of a method according to one embodiment of the present invention.

One or more embodiments of the present invention are illustrated in method 300 of FIG. 3. The method 300 of FIG. 3 may be performed by a local controller (for example, a controller contained within the local equipment of the user, such as a modem or a personal computer attached to a modem) or by a non-operator's remote controller with which the user can communicate (for example, where a user has purchased a subscription to or has purchased equipment compliant with the remote controller's services). A local controller may have access to information and/or data that is available at the user's location only (for example, from an NT or management entity in a local node) and bases decisions on that type of information and/or data. In other embodiments, a controller may be located in a remote location and have access to multiple users' performance/operational data and preference data. In such a remote location situation, the controller likely would not have the data and information available to a centralized controller in a telco CO or the like, but would nevertheless have better information and/or data than a local controller in a modem or the like.

In some embodiments of the present invention, both local and remote controllers can be used. Various combinations of such a system are shown in FIG. 2, where there are local controllers 284 coupled to user equipment 292, local controllers coupled to upstream-end equipment (for example, to DSLAMs in a CO 210, 220 or the like), and one or more remote controllers 288 that can be located anywhere and be coupled to local controllers 284 and/or local controllers 280. In such a configuration, a local controller can be responsible for collecting operational data and/or preference data from one or more modems, sending the data to the remote controller, and implementing instructions, control commands, etc. from the remote controller. The local controller can reside in the modem, a PC connected to the modem, or in/as another device attached to the modem. The remote controller receives operational data, preference data, and/or request data from one or more local controllers, analyzes data and other information as needed, and sends proper instructions, control commands, etc. to at least one user's local controller. The remote controller can have the option to collect further information from an operator's systems such as operational data in MIBs, loop makeup records, information on any line profile(s) imposed on the line of interest, DSLAM equipment information, etc. The CO-side modem data can be collected over a proprietary or other alternative link if both the modems are compatible in that fashion with the remote controller. Also, controls could also be implemented over such a link. The data could be extracted from the CO side MIB and sent via an appropriate link to the CPE, which could then forward that information to any other appropriate systems. Further, a control from any of these systems that the CO would need to implement could also be fed over such a link. The user's local controller 284 also could act as a link between an upstream-end local controller 280 and a remote controller 288, as needed. These and other variations in system configuration will be appreciated by those skilled in the art after reviewing the present disclosure.

One or both of the local controller and remote controller might be able to communicate with or influence the DSLAM (and/or any other upstream device or upstream-end controller) in some embodiments of this invention. As an example, both the user modem and DSLAM might be from a common manufacturer that has implemented a proprietary or other alternative communication path between the two. In such a case, a local/remote controller of this invention might be able to collect data from the DSLAM and implement control signals at the DSLAM via the user modem or the local controller.

In FIG. 3 the non-operator obtains at 305 a model of the operational space imposed by a DSL system operator. Obtaining such a model may include constructing a model from collected data and/or data available from a database or the like, testing and scanning to attempt to learn about the operational space, having information provided by the operator, etc. Based on this model, the non-operator can determine at 310 an operational relationship between a first user preference and a second user preference (for example, a first performance metric and a second performance metric). This may involve collecting and analyzing operational data about a user's performance. In one embodiment, the controller of a user or other non-operator can evaluate the relationship between data rate and service stability, for example by determining whether the user's line set has highly time-variant noise or impulse noise. The controller identifies and generates reasonable options that are applicable to the user's line or line set. At 320 preference data is obtained from one or more users. The user preference data can include direct user information (for example, from direct input from the user) or indirect user information (for example, from an HMM, cluster evaluation or the like, which in this case might be at a remote controller/server that talks to the local equipment). To obtain direct user information, the controller can "correspond" with the user and identify the user's preferences or otherwise assess the user's behavior and likely preferences based on HMM models, user activity, etc. A direct user survey can involve a controller posing a set of questions such as the following (or these can be inferred from service history automatically, without querying the user directly, with answers to the use of various services questions below being derived as a function of their recorded frequency of occurrence):

Do you frequently download files for long periods?

Do you use voice over IP, network gaming programs, or any other latency sensitive programs?

Do you prefer higher data rate or more stable service?

Satisfaction feedback questions such as following can also be included and the user feedback reflected in the analysis:

Are you satisfied with current data rate?

Are you satisfied with stability of your internet connection?

Survey questions also can use ratings or other numerical input data to permit quantification of the user's preferences in analyzing the user preference data later. Direct user correspondence between a controller and a user can be done via phone calls (in case a user has called a user service center for a service subscription, for example), email survey, web interface, etc. In case email or web interface is used, the data can be automatically processed and provided to the controller. As described in more detail below, user preference characteristics also can be inferred by observation of line statistics over time.

The user preference data is analyzed at 330 to determine whether there are operational configurations (for example, user operational parameter vector values, where the user operational parameter vector con contain one or more parameters) that allow user implementation of preferences while still operating within the limits of the modeled operational space provided by the operator/service provider. When user preference data can be implemented within existing system operation rules and operating parameters of the operational space model, then at 340 the controller or other non-operator can implement one or more of the user's operational parameters to implement the user preferences (for example, with regard to the first and second performance metrics). The controller can configure the user's line(s) properly so that the user preferences are in effect until they either are inconsistent with the operator's mandated operational profile or until the user set updates the user preference data, for example by returning to 320 to provide updated user preference data.

Where the operational space and/or operational relationship(s) between preferences (for example, the first performance metric and the second performance metric) evolve or otherwise change (for example, due to time variations in the user's line set performance or other conditions), then method 300 might return to 305 or 310 to reconstruct/reevaluate that relationship prior to obtaining more user preference data. For example, a family may have multiple users whose preferences differ. One family member may want to watch streaming video, requiring a high data rate with minimum service interruptions, while another wants to play network video games (a lower data rate is satisfactory, so long as latency and service interruptions are kept to a minimum). Embodiments of the present invention can allow each individual user of the line set to select the operational mode that best suits their personal use. Each user of a given CPE location might even have their own profile (for example, "Dad's profile") to which that user can switch when using the communication service.

In another embodiment, determining the operational configurations that allow user implementation of preferences while still operating within the limits of the operational profile provided by the operator/service provider involves the following steps at 330. Using the known limits of the operational profile, the allowed values for one or more configurable operational parameters are identified. The selection of any of these values will allow operation of the DSL system within the constraints of the operational profile provided by the operator/service provider. The set of these allowed values represents the optimization space for selecting a value that will meet the requirements imposed by user preference. After accounting for the user preference data, the set of allowed values is further restricted to only those values that will result in system operation that meets both the user preference and the operator rules. Finally, the value of the configurable operational parameter(s) is selected (from values within the restricted set) such that the DSL system achieves a target performance level or the like (for example, high performance). User implementation of preferences thus is achieved within the limits of the operational profile.

In some embodiments, the controller might change the rules used for line set configuration rather than directly changing the line configuration itself. As noted above, some data collection, analysis, HMM construction, configuration, etc. can be performed by a remote location controller, if desired, and be available to local controllers/servers and other remote controllers/servers if they elect to use such data. Moreover, one or more of these methodologies can be implemented in software and/or other computer program products, as will be appreciated by those skilled in the art.

In general, Hidden Markov Models (HMMs) are stochastic signal models that use definable parameters to model complex behaviors. HMMs use a number of internal or hidden states and a defined state sequence described by state transition probabilities to model complex behaviors. The systems use outputs that are distinct from the internal states. The output, called an observable symbol, can be a scalar value representing a single input and/or input type to the HMM, or a vector quantity representing multiple inputs and/or input types. The observable symbols are used to model the HMM, as well as to generate probabilities that represent how well the HMM matches the measured data.

More specifically, a given system (such as a communication system) typically has number of internal states that are not directly observable. HMMs implemented according to embodiments of the present invention assist in determining, among other things, the current state, the next state to which the system might transition, and the probability that the system is in a given state when one or more observable symbols of the system are known. Mathematically, an HMM can be described as follows:

N: the number of hidden states.

M: the number of observable scalar or vector symbols.

A: the state-transition probability matrix of state j moving to state i in the next time period, where $a_{ij}=\Pr(n_{t+1}=i|n_t=j)$, $1 \leq i, j \leq N$, and where t is the time period index and $n_t$ is the state number during time period t.

B: the observation probability distribution vector of observing symbol k while the state is j where $B_j(k)=\Pr(o_t=k|n_t=j)$, $1 \leq k \leq M$, $1 \leq j \leq N$ and $o_t$ is the observed symbol during time period t.

π: the initial state distribution, $\pi_j=\Pr(n_1=j)$, $1 \leq j \leq N$.

λ: the entire HMM model $\lambda=(A, B, \pi)$.

Note that one of the M symbols is observed in each time period, but the state needs to be estimated based on the observation because it is not directly observable.

In the embodiments of the present invention, one or more HMMs can be used to estimate one or more user preference data. This data might represent states such as how often a given communication line is in use and what kind of use is being made of the line (for example, VoIP and other high demand uses). In some cases, each state may be a performance metric (for example, user satisfaction with service stability), while the output relied upon may be a single operating or performance parameter value or distribution, or an operating or performance condition (for example, customer complaints), or a combination of parameters and/or performance characteristics.

An HMM can be selected on the basis of information available from the user and/or information (if any) available from the communication system. In the case of DSL systems, there are a number of parameters and/or data available from a system MIB and/or other components of the system, as noted above and below in this disclosure. Moreover, a controller/server outside of the service provider such as a remote location controller/server and/or local controllers at each user can collect other operational data from the system via other means, as discussed in more detail herein.

Embodiments of the present invention use an HMM to assist in estimating the preferences of the user under consideration. Various examples of embodiments of the present invention are presented herein in connection with DSL systems. However, as will be appreciated by those skilled in the art, the invention applies more generally to any communication system in which the methods, apparatus and other embodiments of the present invention can be applied.

In some embodiments of this invention, a methodology used to identify the user preferences can be viewed as being related to the algorithm area variously known as "non-supervised learning" or "clustering" or "vector quantization" (though none of these fields has been applied in a manner similar to that used in connection with embodiments of the present invention).

The following steps may be taken:
a) Observed data from a DSL link of a user with unknown user preferences are formatted into a vector x (for example, ATM cell counts, current data rate, CV violations, FEC corrections, etc.);
b) Vector x is classified into one of several clusters based on a minimum distance criterion;
c) Other DSL links of users with known user preferences belonging to the selected cluster are examined to estimate the user preferences for the DSL link of the user with unknown user preferences (for example, user preferences may indicate traffic loads, traffic type, etc.).

In some embodiments, clustering methods include separate methods for training and separate methods for the classification described above. Generic training methods related to clustering are well known to those skilled in the art (though they have not been applied to the types of situations addressed by embodiments of the present invention). An example illustrating one or more methods according to the present invention follows. Let x be the vector of observed data of the DSL link and let $y_i$, i=1, . . . , C be vectors associated with C clusters, where each cluster corresponds to a distinct user preference. The following steps are performed:

i. Initialize vectors $y_i$, i=1, . . . , C.
ii. Perform one or more iterations to obtain new model vectors $y_i$, i=1, . . . , C based on a training set of data.
iii. Compute the total distortion for the training set of data.
iv. If the total distortion is smaller than some threshold, then exit; otherwise, go to step ii.

Steps ii and iii are now described in more detail.
For step ii:
a) For each vector x belonging to the training set, find the cluster/model i for which $d(x,y_i) \leq d(x,y_j)$ for any j other than i.
b) For each cluster, recompute $y_i$ as the mean of all vectors x of the training set that also belong to cluster/model i. "Mean" is defined here to be any appropriate averaging operation, as will be appreciated by those skilled in the art.

For step iii:
a) Compute total distortion as D=average[$d(x,y_i)|d(x,y_i) \leq d(x,y_j)$, j≠i]. In other words, it is the average distance of each vector of the training set of data from the closest $y_i$ vector.
b) By using the above classification stage methodology, vector x of observed data can be classified into one of C clusters, where each cluster is related to one or more specific loop characteristics (for example, a specific HMM).

Figure 4:
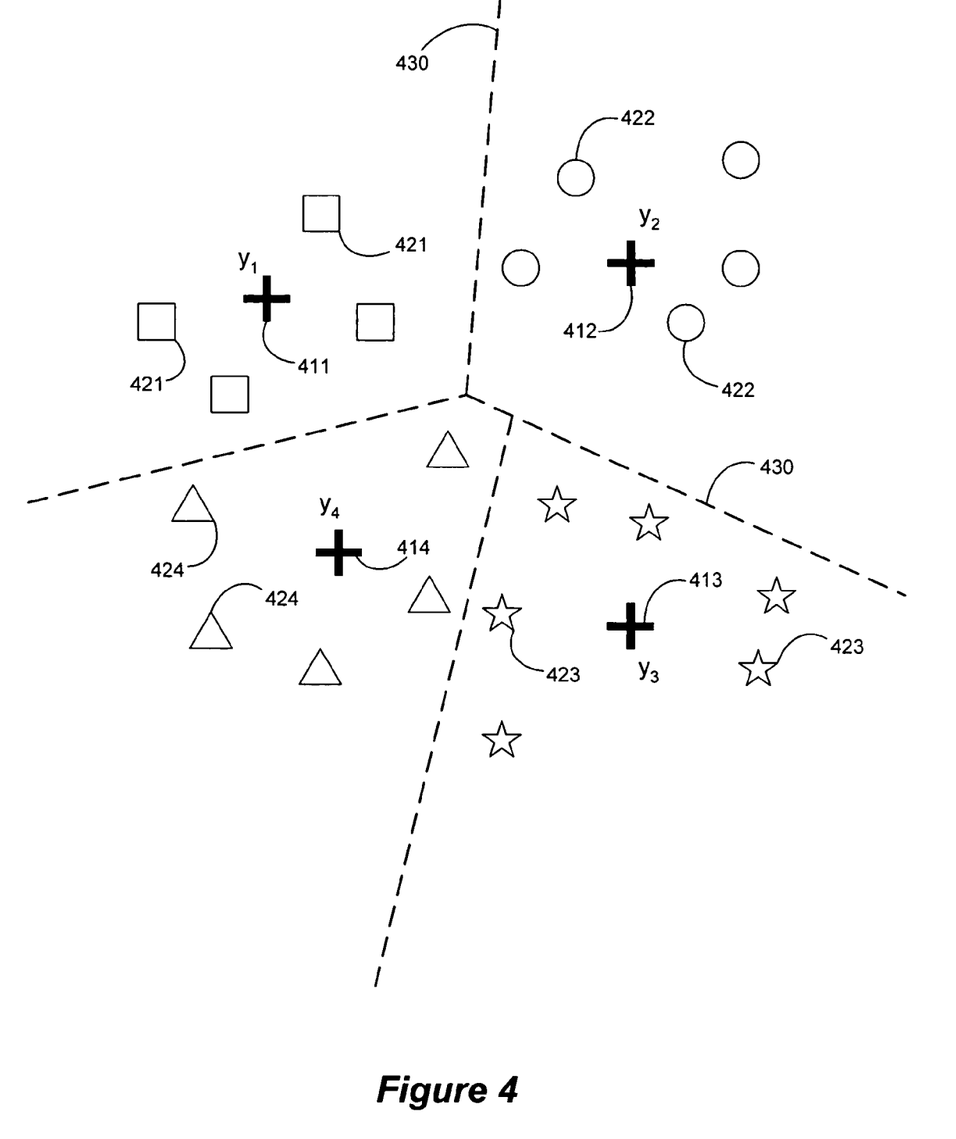
FIG. 4 is a diagram illustrating a method using clustering according to one embodiment of the present invention.

FIG. 4 illustrates one embodiment of the present invention implementing the previous example and using clusters for the case of 4 clusters. Each cross 411, 412, 413, 414 corresponds to a vector $y_i$. The classification of DSL lines into clusters also is shown, where DSL lines classified into the same cluster are shown as squares 421, circles 422, stars 423 and triangles 424 bounded by the lines 430. DSL lines in the same cluster correspond to users that have the same or similar preferences. In these types of systems, user preference data from the DSL system can be collected determining a set of clusters corresponding to distinct user preferences. The cluster set can contain as many clusters (or cluster points) as needed to sufficiently categorized the user preferences. Operational data from the DSL system can then be collected after which a given user can be assigned to a specific cluster based on the collected operational data. The user preference data then i based on the assignment of the user to the assigned cluster.

In some embodiments of the present invention, preference data can be obtained from data that may be stored in a user's computer, network equipment, DSL modem or the like. Such data may include network statistics (for example, ATM cell counts, packet counts, packet delay metrics, etc.), application information (for example, video decoder, entertainment system, VoIP phone, etc.) and other data that may be used to extract information about user preference.

The evaluation of whether a line and/or system should be configured, maintained or altered and/or any other evaluation of operational data according to embodiments of the present invention may be required to be based on the most recently available operational data pertaining to the operational condition or may be based on historical data as well as the current data. For example, if a noise source (for example, an appliance or other device) that has caused performance problems in the past is removed (for example, thrown away by a resident), its prior influence on the structure of an HMM and/or implementation of rules pertaining to noise from the source should be removed or at least reduced. Therefore, if historical data is used, it may be weighted in any suitable manner. For example, a data weighting vector (W) can be given to each line and/or operational condition so that the weighting of current and historical data can be applied as a function of how current the data is. For instance, if the weighting vector is W1=[1 1 1], then the data from the last three update periods (for example, days) are given equal weight in evaluating compliance. If the weighting vector is W2=[1 0 0 0 0 0 0 0.5], then the data from the last reported operational condition data is used with weighting 1 and data from 7 update periods earlier (for example, one week ago) is used with weighting 0.5. Data from other update periods are ignored. If it is desired to use data from only the last 2 months with equal weighting, then the weighting vector can be of size 60 with all ones (that is, W3=[1 1 1 . . . 1 1 1]), using an update period of one day. Different weighting vectors can be used for different operational conditions, for example depending on whether a single reading should serve as the basis for any decision and/or change to an HMM.

In addition to the timeliness of the operational data considered, the evaluation of whether any decision should be made and/or action taken, and/or any other evaluation of operational data, may be required to be based on a sufficient quantity of available operational data. For example, in some cases, the data collection system might malfunction or be inactive, meaning that too little or no data might be available. In such cases, it might be helpful for the system to abstain from making any changes to a system and/or line operation, or any limits and/or parameters applicable thereto, when there is insufficient data on which to base reliable evaluation. To prevent an inappropriate change from being implemented, implementation of a change can be limited only to those cases when sufficient additional data has been collected since the last evaluation or within a specified time period. Operational data may be viewed using cardinality techniques and data probability distributions. Sophisticated distribution estimation might be used to reduce the influence of distant past values in favor of more recently collected data and are well understood by those skilled in the art. If a data sufficiency or timeliness rule is not satisfied, then no action may be taken until new data is collected that allows such a rule to be met.

Several examples likewise illustrate embodiments of the present invention.

Example 1

In this example, the user, perhaps with assistance of a remote location controller/server, may discern that other users in the same binder have use patterns that complement the subject user's own use patterns and thus a reallocation of used bandwidth may be desirable. A local controller could then lower data rates or increase them in time synchronization with other users so that the subject user's line has maximum use among all users. Such local control might occur on a peer-to-peer basis among the local controllers or possibly with the assistance (and enablement for subscription purposes) of a coordinating controller or center. In addition, the user's modem might assist the user's local controller and/or a remote controller in obtaining information, data and/or controls from an upstream-end device and/or controller to assist in evaluating and/or implementing the user's preferences. In such an exemplary implementation, a user-controlled system might be much faster in implementing preference changes as compared to an operator-controlled system. For example, an operator-controlled system might require at least several hours to implement preference changes.

Example 2

The user preference may include preference towards using the DSL service with specific applications that are characterized by known traffic types. Knowledge of user preference may thus be exploited to tune configurable parameters of network protocols such as TCP, UDP, RTP. Such tuning would aim to improve transmission for the traffic types most often associated with the user. Network protocol statistics such as packet loss, throughput, buffer sizes can also be combined with knowledge of user preference to configure DSL physical layer parameters such as latency settings and impulse noise protection.

Figure 5:
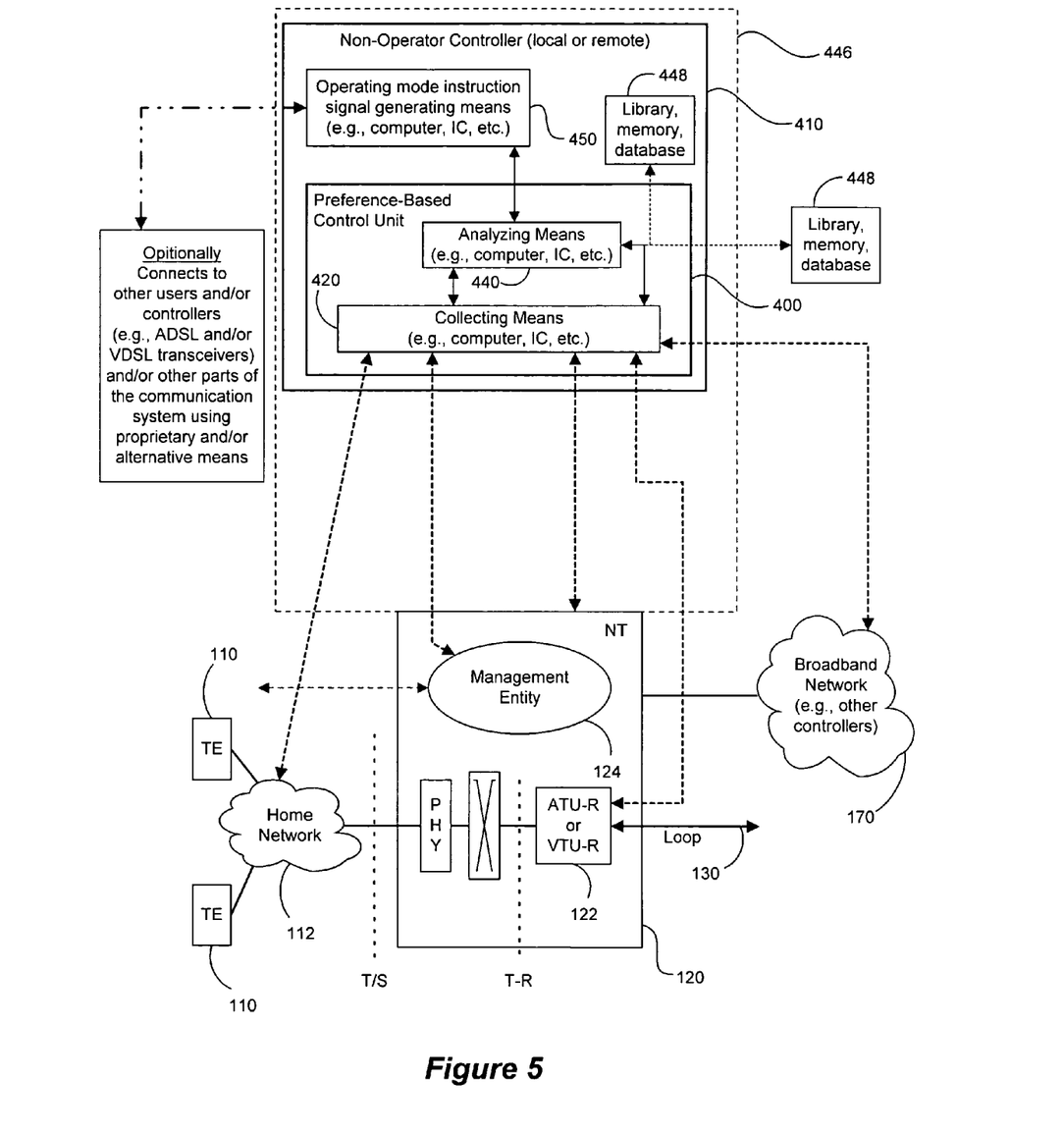
FIG. 5 controller including a user-preference-based control unit of a non-operator according to one embodiment of the present invention.
Figure 6:
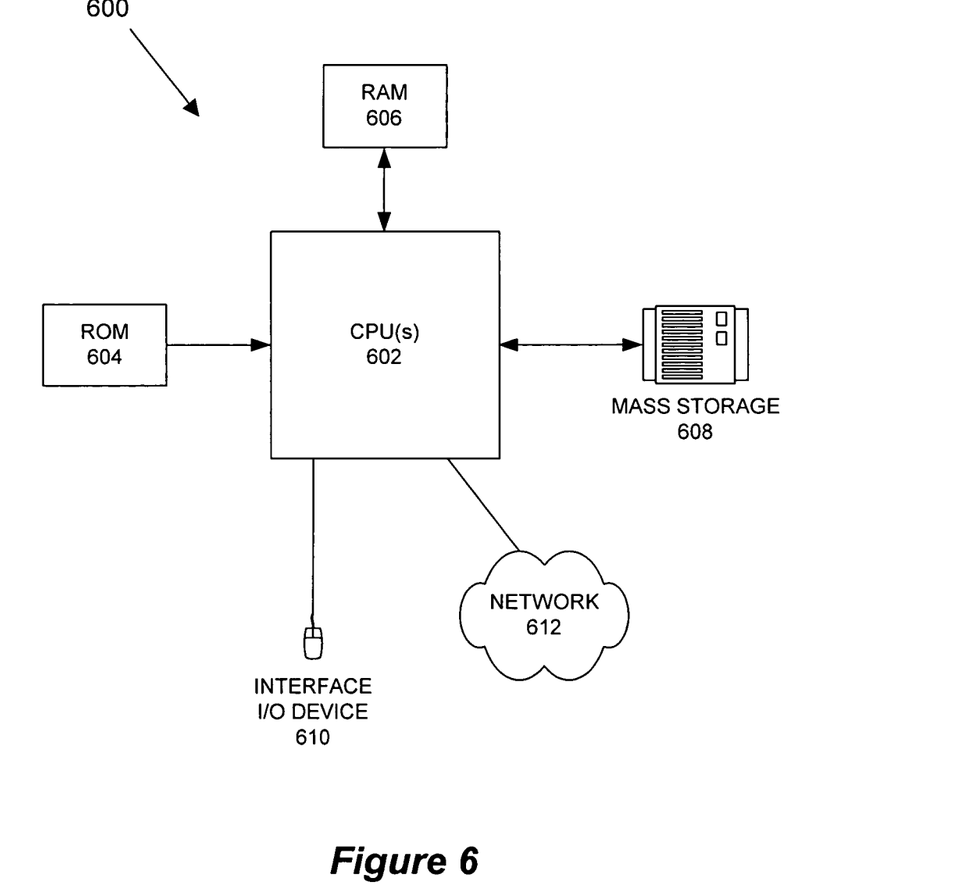
FIG. 6 is a block diagram of a typical computer system or integrated circuit system suitable for implementing embodiments of the present invention.

According to one embodiment of the present invention shown in FIG. 5, a preference-based control unit 400 may be part of an independent entity coupled to a DSL or other communication system, such as a controller 410 (for example, a device functioning in a user's local equipment or a remote location controller as described above) assisting one or more users of the system. A remote controller not located in a CO, telco, etc. may also be referred to as a dynamic spectrum manager, Dynamic Spectrum Management Center, Preference Implementation Center, User Assistance Center, DSM Center, Spectrum Maintenance Center, SMC or any other similar name and be part of a service suite offered to users by subscription or via the purchase of equipment compliant with the controller's services. In some embodiments, the controller 410 may be a completely independent entity. In other embodiments, the controller 410 can be part of the user's equipment, as seen in FIG. 5. As seen from the dashed line 446 in FIG. 5, the controller 410 may be housed in a modem or the like. Moreover, controller 410 may be coupled to and/or controlling DSL and/or other communication lines of multiple users.

The preference-based control unit 400 includes a data collection unit 420 identified as a collecting means and an analysis unit 440 identified as analyzing means. As seen in FIG. 5, the collecting means 420 (which can be a computer, processor, IC, computer module, etc. of the type generally known) may be coupled to ME 124 at NT 120, to an NT modem 122, or more generally to an NT 120, any or all of which may be part of a DSL system for example. Where the controller 410 is implemented at a user's location, the controller 410 may be a computer such as a home PC or the like running software or other computer program products that control and assist with communications. In such case, the collecting means 420 may be coupled to the home network 112. Data also may be collected through a broadband network 170 (for example, via the TCP/IP protocol or other protocol or means outside the normal internal data communication within a given DSL system).

One or more of these connections allows the preference-based control unit 400 to collect operational data from the user's line and, if appropriate, elsewhere (possibly the broader system). Data may be collected once or over time. In some cases, the collecting means 420 will collect on a periodic basis, though it also can collect data on-demand or any other non-periodic basis (for example, when a DSLAM or other component sends data to the preference-based control unit), thus allowing the preference-based control unit 400 to update its information, operation, etc., if desired. Data collected by means 420 is provided to the analyzing means 440 (which also can be a computer, processor, IC, computer module, etc. of the type generally known) for analysis and any decision regarding user preferences concerning one or more performance metrics performance metrics, the construction and/or modification of one or more HMMs to be used in estimating user preferences, defining operational parameters that will permit implementation of user-preferred performance metrics to the extent possible, etc. in the communication system.

In the exemplary system of FIG. 5, the analyzing means 440 is coupled to a signal generating means 450 in the controller 410. This signal generator 450 (which can be a computer, processor, IC, computer module, etc.) is configured to generate and send instruction signals to the user's modem and/or other components of the user's link to the communication system. These instructions may include instructions regarding data rates, transmit power levels, coding and latency requirements, retraining scheduling and implementation, system configuration instructions, requests for user preference data and/or other data, etc. Instructions may be generated after the controller 410 determines whether one or more user preferences can be implemented on a user's line set coupled to the controller 410. In some embodiments, a link could pass information and controls to be implemented completely outside the influence of an operator. This may be the result of capabilities inherently available in the equipment being used or may be due to a subscription to such service that a user may obtain.

Embodiments of the present invention can utilize a database, library or other collection of data pertaining to data collected (including user preference data and other types of data), previously constructed HMMs, etc. This collection of reference data may be stored, for example, as a library 448 in the controller 410 of FIG. 5 and used by the analyzing means 440 and/or collecting means 420.

In some embodiments of the present invention, the preference-based control unit 400 may be implemented in one or more computers such as PCs, workstations or the like and/or in one or more computer program products. The collecting means 420 and analyzing means 440 may be software modules, hardware modules or a combination of both, as will be appreciated by those skilled in the art. When working with a large numbers of modems, lines, users, etc., databases may be introduced and used to manage the volume of data collected.

Generally, embodiments of the present invention employ various processes involving data stored in or transferred through one or more computer systems, which may be a single computer, multiple computers and/or a combination of computers (any and all of which may be referred to interchangeably herein as a "computer" and/or a "computer system"). Embodiments of the present invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

FIG. 5 illustrates a typical computer system that can be used by a user and/or controller in accordance with one or more embodiments of the present invention. The computer system 500 includes any number of processors 502 (also referred to as central processing units, or CPUs) that are coupled to storage devices including primary storage 506 (typically a random access memory, or RAM), primary storage 504 (typically a read only memory, or ROM). As is well known in the art, primary storage 504 acts to transfer data and instructions uni-directionally to the CPU and primary storage 506 is used typically to transfer data and instructions in a bi-directional manner. Both of these primary storage devices may include any suitable of the computer-readable media described above. A mass storage device 508 also is coupled bi-directionally to CPU 502 and provides additional data storage capacity and may include any of the computer-readable media described above. The mass storage device 508 may be used to store programs, data and the like and is typically a secondary storage medium such as a hard disk that is slower than primary storage. It will be appreciated that the information retained within the mass storage device 508, may, in appropriate cases, be incorporated in standard fashion as part of primary storage 506 as virtual memory. A specific mass storage device such as a CD-ROM 514 may also pass data uni-directionally to the CPU.

CPU 502 also is coupled to an interface 510 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to a computer or telecommunications network using a network connection as shown generally at 512. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 508 or 514 and executed on CPU 502 in conjunction with primary memory 506. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method comprising:
    operating a Digital Subscriber Line (DSL) system, the method limited to digital communication over existing telephone subscriber lines within the DSL system;
    collecting data from the DSL system by a party other than a telco operator of the DSL system;
    analyzing the collected data to determine an operational relationship between a first performance metric relating to operation of the DSL system and a second performance metric relating to operation of the DSL system;
    collecting DSL customer data indicating a DSL customer's preferences for operation of existing DSL service provided to the DSL customer via the DSL system, wherein the collected DSL customer data includes direct user information and indirect user information;
    analyzing the collected DSL customer data to determine a customer operational parameter vector value that permits operation of the DSL system in accordance with the first and second performance metrics and implements, onto the existing DSL service provided to the DSL customer, one or more of the DSL customer's preferences reflected in the collected DSL customer data; and
    implementing the determined customer operational parameter vector value onto the existing DSL service provided to the DSL customer, wherein implementing the determined customer operational parameter vector value onto the existing DSL service provided to the DSL customer is initiated by the party other than the telco operator of the DSL system.

2. The method of claim 1 wherein analyzing the collected data to determine the operational relationship between a first performance metric and a second performance metric further comprises at least one of the following:
    collecting operational space data from a database, wherein the operational space data describes the operational relationship between the first performance metric and the second performance metric and further describes operational characteristics and parameters of the DSL system; or
    collecting the operational space data from the DSL system.

3. The method of claim 1 wherein collecting the DSL customer data comprises at least one of the following:
    conducting a user survey;
    sending an email questionnaire;
    obtaining user feedback via user calls;
    using a web interface; and
    obtaining direct user feedback.

4. The method of claim 1 wherein collecting the DSL customer data comprises:
    obtaining a Hidden Markov Model (HMM);
    collecting operational data from the DSL system;
    using the collected operational data to determine an HMM internal state; and
    using the HMM internal state to derive the DSL customer's preferences.

5. The method of claim 1 wherein collecting the DSL customer data comprises:
    determining a set of clusters corresponding to distinct preferences of the DSL customer, wherein the set of clusters comprises a first cluster;
    collecting operational data from the DSL system;
    assigning the DSL customer to the first cluster based on the collected operational data; and
    generating the customer operational parameter vector value based on the assignment of the DSL customer to the first cluster.

6. The method of claim 1 wherein collecting the DSL customer data comprises querying a database to obtain the DSL customer data.

7. The method of claim 1 wherein analyzing the collected DSL customer data comprises:
    determining a customer operational parameter vector to be configured;
    identifying a set of allowed customer operational parameter vector values within the customer operational parameter vector to be configured, wherein each customer operational parameter vector value in the set complies with the first and second performance metric;
    limiting the set of allowed customer operational parameter vector values of the customer operational parameter vector to comply with the DSL customer's preferences; and
    determining a customer operational parameter vector value of the customer operational parameter vector from within the limited set of allowed customer operational parameter vector values that achieves a target performance level.

8. The method of claim 1 further comprising retraining the DSL system prior to implementing the customer operational parameter vector value.

9. The method of claim 1 wherein analyzing the collected DSL customer data comprises:
    collecting operational data of the DSL system; and
    determining the feasibility of implementing one or more preferences reflected in the collected DSL customer data in light of the collected operational data of the DSL system.

10. The method of claim 9 wherein collecting operational data of the DSL system comprises one or more operations selected from the group comprising:
    applying a weighting factor to the collected operational data;
    performing a sufficiency check on the collected operational data;
    performing a timeliness check on the collected operational data;
    applying a weighting factor to the collected user preference data;
    performing a sufficiency check on the collected user preference data;
    performing a timeliness check on the collected user preference data;
    applying a weighting factor to the operational space model;

performing a sufficiency check on the operational space model; and performing a timeliness check on the operational space model.

11. The method of claim 1, wherein the telco operator of the DSL system comprises a telecommunications company (telco) DSL system operator having operational control of the DSL system to define, limit, and set the operational space for the DSL system.

12. A non-transitory computer-readable storage medium having instructions stored thereon that, when executed by a DSL system, cause the DSL system to perform a method comprising:

operating a Digital Subscriber Line (DSL) system, the method limited to digital communication over existing telephone subscriber lines within the DSL system;

collecting data from the DSL system by a party other than a telco operator of the DSL system;

analyzing the collected data to determine an operational relationship between a first performance metric relating to operation of the DSL system and a second performance metric relating to operation of the DSL system;

collecting DSL customer data indicating a DSL customer's preferences for operation of existing DSL service provided to the DSL customer via the DSL system, wherein the collected DSL customer data includes direct user information and indirect user information;

analyzing the collected DSL customer data to determine a customer operational parameter vector value that permits operation of the DSL system in accordance with the first and second performance metrics and implements, onto the existing DSL service provided to the DSL customer, one or more of the DSL customer's preferences reflected in the collected DSL customer data; and implementing the determined customer operational parameter vector value onto the existing DSL service provided to the DSL customer, wherein implementing the determined customer operational parameter vector value onto the existing DSL service provided to the DSL customer is initiated by the party other than the telco operator of the DSL system.

13. A Digital Subscriber Line (DSL) system controller comprising:

a data collection unit to:
collect operational data from the DSL system by a party other than a telco operator of the DSL system, and
collect DSL customer data regarding operation of an existing DSL service provided to a DSL customer via the DSL system, wherein the operation of the existing DSL service is limited to digital communication over existing telephone subscriber lines associated, and wherein the collected DSL customer data indicates the DSL customer's preferences for operation of the existing DSL service based on direct user information and indirect user information;

an analysis unit coupled to the collection unit, wherein the analysis unit is to:
analyze the collected operational data to determine an operational relationship between a first performance metric relating to operation of the DSL system and a second performance metric relating to operation of the DSL system, and
analyze the collected DSL customer data to determine a customer operational parameter vector value that permits operation of the DSL system in accordance with the first and second performance metrics and implements, onto the existing DSL service provided to the DSL customer, one or more of the DSL customer's preferences reflected in the collected DSL customer data; and a control signal generator coupled to the analysis unit, wherein the control signal generator is to:
send control signals to the DSL system, wherein the control signals comprise signals to implement the determined customer operational parameter vector value onto the existing DSL service provided to the DSL customer, wherein the control signal generator to send the control signals to the DSL system to implement the determined customer operational parameter vector value onto the existing DSL service provided to the DSL customer is initiated by the party other than the telco operator of the DSL system.

14. The controller of claim 13 where the controller comprises one device selected from the group comprising:
a controller communicatively interfaced with a downstream-end device;
a controller communicatively interfaced with an upstream-end device;
a controller communicatively interfaced with both a downstream-end device and an upstream-end device;
a remote controller; and
a local controller.

15. The controller of claim 13 wherein the data collection unit to further:
construct a Hidden Markov Model (HMM);
determine the internal state of the HMM based on the collected operational data from the DSL system; and
derive the DSL customer's preferences from the DSL customer data based on the determined internal state of the HMM.

16. The controller of claim 13 wherein the collection unit is to further:
determine a set of clusters corresponding to distinct preferences of the DSL customer, wherein the set of clusters comprises a first cluster;
assign the DSL customer to the first cluster based on the collected operational data; and
generate the customer operational parameter vector value based on the assignment of the DSL customer to the first cluster.

17. The controller of claim 13 wherein the data collection unit to collect the DSL customer data comprises the data collection unit to:
collect data stored within a home network associated with the DSL customer; and
extract the DSL customer's preferences from the collected data stored within the home network associated with the DSL customer.

18. The controller of claim 13 wherein the data collection unit is communicably interfaced with one or more entities selected from the group comprising:
the telco operator;
a service provider;
a user communication device; and
a different controller.

19. The controller of claim 13 wherein the analysis unit is to further:
determine a customer operational parameter vector to be configured;
identify a set of allowed customer operational parameter vector values within the customer operational parameter vector to be configured that comply with the first and second performance metric;

limit the identified set of allowed customer operational parameter vector values to comply with the DSL customer's preferences;

determine the customer operational parameter vector value of the customer operational parameter vector from the restricted set of allowed customer operational parameter vector values that achieves target performance metrics.

20. The controller of claim 13 wherein the control signal generator is to further send a retrain signal to the DSL system.

21. The controller of claim 13 wherein the data collection unit is to further perform one or more operations selected from the group comprising:

apply a weighting factor to the collected operational data;

perform a sufficiency check on the collected operational data;

perform a timeliness check on the collected operational data;

apply a weighting factor to the collected user preference data;

perform a sufficiency check on the collected user preference data;

perform a timeliness check on the collected user preference data;

apply a weighting factor to the operational space model data;

perform a sufficiency check on the operational space model data; and perform a timeliness check on the operational space model data.

* * * * *